(12) United States Patent
Baker

(10) Patent No.: US 11,610,425 B2
(45) Date of Patent: Mar. 21, 2023

(54) FINGERPRINT SENSOR CONTROLS BASED ON OPERATING STATES

(71) Applicant: Hewlett-Packard Development Company, L.P., Spring, TX (US)

(72) Inventor: Abu Mohammed Ali Baker, Spring, TX (US)

(73) Assignee: HEWLETT-PACKARD DEVELOPMENT COMPANY, L.P., Spring, TX (US)

( * ) Notice: Subject to any disclaimer, the term of this patent is extended or adjusted under 35 U.S.C. 154(b) by 0 days.

(21) Appl. No.: 17/052,323

(22) PCT Filed: Nov. 5, 2018

(86) PCT No.: PCT/US2018/059168
§ 371 (c)(1),
(2) Date: Nov. 2, 2020

(87) PCT Pub. No.: WO2020/096562
PCT Pub. Date: May 14, 2020

(65) Prior Publication Data
US 2021/0256241 A1  Aug. 19, 2021

(51) Int. Cl.
*G06V 40/13* (2022.01)
*G06F 1/32* (2019.01)
*G06F 13/40* (2006.01)

(52) U.S. Cl.
CPC ................ *G06V 40/13* (2022.01); *G06F 1/32* (2013.01); *G06F 13/4068* (2013.01)

(58) Field of Classification Search
CPC ........ G06V 40/13; G06F 1/32; G06F 13/4068
See application file for complete search history.

(56) References Cited

U.S. PATENT DOCUMENTS

| | | | |
|---|---|---|---|
| 7,690,030 B1 | 3/2010 | Ma et al. | |
| 9,460,334 B2 | 10/2016 | Lan et al. | |
| 9,836,592 B2 | 12/2017 | Huang et al. | |
| (Continued) | | | |

FOREIGN PATENT DOCUMENTS

| | | |
|---|---|---|
| CN | 107820598 | 3/2018 |
| WO | 2018/064886 A1 | 4/2018 |
| WO | WO-2018063258 | 4/2018 |

*Primary Examiner* — Abhishek Sarma
(74) *Attorney, Agent, or Firm* — Knobbe, Martens, Olson & Bear, LLP

(57) ABSTRACT

An example non-transitory machine-readable storage medium includes instructions to disambiguate a finger touch at a fingerprint sensor device. When executed, the instructions cause a processor of a computing device to identify an operating state of the computing device when the computing device is powered on. The operating state includes a powered-on state of the computing device. The instructions further cause the processor to obtain fingerprint data from the fingerprint sensor device, the fingerprint sensor device including a fingerprint sensor to read a fingerprint and a power button to alter the operating state of the computing device. The instructions further cause the processor to selectively enable the fingerprint sensor based on the operating state and selectively enable the power button based on the operating state to disambiguate the finger touch at the fingerprint sensor device.

17 Claims, 9 Drawing Sheets

(56) References Cited

U.S. PATENT DOCUMENTS

| | | |
|---|---|---|
| 9,967,100 B2 | 5/2018 | Hong et al. |
| 2009/0278807 A1 | 11/2009 | Hu |
| 2009/0315675 A1 | 12/2009 | Yokota |
| 2012/0019356 A1 | 1/2012 | Gagneraud et al. |
| 2013/0159690 A1 | 6/2013 | Tsukamoto et al. |
| 2015/0199554 A1 | 7/2015 | Merrell et al. |
| 2017/0147800 A1 | 5/2017 | Huang et al. |
| 2019/0213384 A1* | 7/2019 | Lu ...................... G06V 40/1365 |
| 2019/0311175 A1 | 10/2019 | Zhang et al. |

* cited by examiner

| Current State \ Next State | Powered-Off 302 | Standby 304 | Login Screen 306 | Desktop 308 |
|---|---|---|---|---|
| Powered-Off 302 | - | | 310 Duration > 4s | 318 BP Pressed & SSO Enabled |
| Standby 304 | 330 Duration > 4s | - | 322 4s > Duration > 1s | 326 WOF Enabled & Match = true |
| Login Screen 306 | 312 Duration > 4s | 324 4s > Duration > 1s | - | 314 Match = true |
| Desktop 308 | 320 Duration > 4s | 328 4s > Duration > 1s | 316 Log Off | - |

| | Operating State | | | | | | Fingerprint Sensor Device | | |
|---|---|---|---|---|---|---|---|---|---|
| Powered-Off | Standby | Login Screen | Desktop | SSO Enabled | Lid Closed | FPS Ready-to-Capture | Fingerprint Scanning | WOF | Power Button Enabled |
| 0 | 0 | 0 | 1 | ... | 0 | 1 | ... | ... | 0 |
| ... | ... | ... | 0 | ... | 1 | 0 | ... | 0 | ... |
| 0 | 1 | 0 | 0 | ... | 0 | 0 | 0 | ... | ... |
| 0 | 1 | 0 | 0 | 1 | ... | 0 | 0 | ... | ... |

FIG. 4

FINGERPRINT SENSOR CONTROLS BASED ON OPERATING STATES

BACKGROUND

A computing device may include a fingerprint sensor to scan a users fingerprint. A users fingerprint may be used by an operating system or software application for an authentication purpose, or to sign the user into a user account at the computing device. A fingerprint sensor may be integrated with a power button of the computing device to allow a user to simultaneously wake the computing device and sign the user into the users account with a single touch.

BRIEF DESCRIPTION OF THE DRAWINGS

FIG. 4 is a table of example instructions to selectively enable a fingerprint sensor and a power button of an FPS device based on an operating state of a computing device.

DETAILED DESCRIPTION

Figure 1:
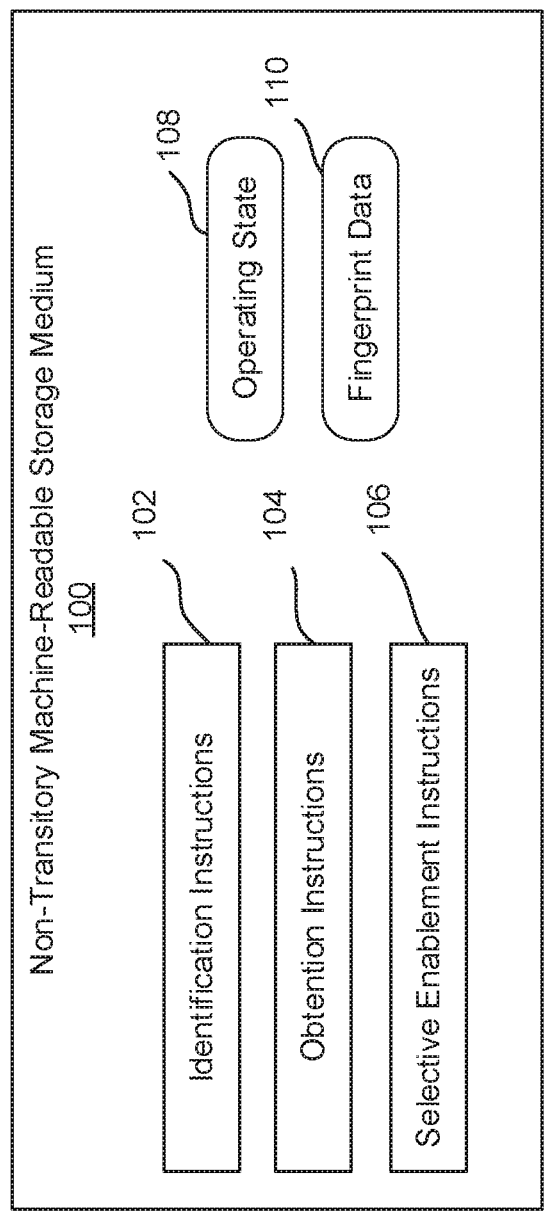
FIG. 1 is a schematic diagram of an example non-transitory machine-readable storage medium. The storage medium stores instructions to cause a processor of a computing device to execute tasks to selectively enable a fingerprint sensor of a fingerprint sensor ("FPS") device and selectively enable a power button of the FPS device.

Fingerprint sensors may be integrated with power buttons on computing devices, such as notebook computers, to provide a convenient way for a user to change an operating state of a computing device with a single user interface component. For example, a user may shut down, wake up, login, or logout of the computing device using the integrated fingerprint sensor-power button. An integrated fingerprint sensor-power button may be referred to herein as a fingerprint sensor ("FPS") device. An FPS device may include an optical, capacitive, or similar type of scanner built into a button, which may be responsive to touch or a physical press by a finger tip.

A user may wish to use an FPS device for a fingerprint scanning purpose only, such as to scan a fingerprint to provide authentication to an application running on the computing device. In other instances, a user may wish to use an FPS device only to alter an operating state of a computing device, such as when the user wishes to press the FPS device to shut down the computing device. Further, in other instances, an FPS device may allow a user to use the power button and a feature of the fingerprint sensor simultaneously with a single touch. For example, a user may touch an FPS device to both wake a computing device from a sleep state and sign into the user's account associated with the computing device.

Although convenient, a fingerprint sensor integrated with a power button may be prone to accidental or unintentional use. For example, a user using the computing device in a powered-on state may accidentally shut down the computing device by an accidental press of an FPS device. Further, an FPS device may misinterpret an attempt to scan a fingerprint as an attempt to shut down the computing device. As another example, a user may accidentally wake up a computing device from a low-power state by accidentally touching the FPS device while carrying the computing device.

Accidental or unintentional use of an FPS device may be mitigated by identifying an operating state of the computing device, including a powered-on state of the computing device, and selectively enabling the fingerprint sensor and the power button of the FPS device based on an operating state of the computing device.

A non-transitory machine-readable storage medium may include instructions that, when executed, cause a processor of a computing device to identify an operating state of the computing device when the computing device is powered on. The operating state may include a powered-on state of the computing device. The instructions may further cause the processor to obtain fingerprint data from an FPS device, the FPS device including a fingerprint sensor to read a fingerprint and a power button to alter the operating state of the computing device. The instructions may further cause the processor to selectively enable the fingerprint sensor based on the operating state and selectively enable the power button based on the operating state to disambiguate a finger touch at the FPS device.

Selectively enabling the fingerprint sensor may include disabling the fingerprint sensor based on the operating state of the computing device.

Selectively enabling the power button may include disabling the power button based on the operating state of the computing device. The operating state may include a powered-on state of the computing device, such as whether the computing device is in a low-power state such as a sleep state, or in a full-power state. The operating state may also include a login state of the computing device, such as whether a user account is authenticated to be signed into the computing device. Further, the fingerprint data may include a duration of the finger touch at the FPS device, and instructions may dictate that the fingerprint sensor is to be disabled when the duration of the finger touch is within a range corresponding to altering the operating state of the computing device and the computing device is in a low-power state. Further, instructions may dictate that the fingerprint sensor is to be disabled when the duration of the finger touch is within a range corresponding to a fingerprint scan and the computing device is in a full-power state. The instructions may thereby disambiguate a finger touch of an FPS device and mitigate accidental or unintentional use of the FPS device.

FIG. 1 is a schematic diagram of an example non-transitory machine-readable storage medium 100 which stores such instructions. The instructions cause a processor of a computing device to execute tasks to disambiguate a finger touch at an FPS device of the computing device. The computing device may include a notebook computer, desktop computer, smartphone, or any suitable computing device which includes an FPS device and a non-transitory machine-readable storage medium.

The medium 100 includes identification instructions 102 to cause the processor of the computing device to identify an operating state 108 of the computing device when the computing device is powered on. The operating state 108 includes a powered-on state of the computing device. Further, a powered-on state may indicate whether the computing device is in a low-power state, such as a sleep state, or in a full-power state for when the computing device is being actively used by a user. The operating state may also include a login state of the computing device, such as whether a user account is authenticated to be signed into the computing device. The operating state may further include a setting of the computing device or of the FPS device, such as whether a single-sign-on feature is enabled, whether a wake-on-fingerprint feature is enabled, whether the FPS device is in a ready-to-scan state, and whether a lid of the computing device is closed.

The medium 100 further includes obtention instructions 104 to cause the processor of the computing device to obtain fingerprint data 110 from an FPS device. The FPS device includes a fingerprint sensor to read a fingerprint and a power button to alter the operating state 108 of the computing device. The fingerprint data includes data transmitted from the FPS device, which may include whether the FPS device is pressed, the duration of a touch of the FPS device, and whether the fingerprint scanner of the FPS device has detected a matching fingerprint which would authenticate a login to a user account associated with the computing device.

The medium 100 further includes selective enablement instructions 106 to selectively enable the fingerprint sensor based on the operating state 108 and selectively enable the power button based on the operating state 108 to disambiguate a finger touch at the FPS device. The selective enablement instructions 106 may include instructions to disable or enable one or both of the fingerprint sensor and the power button of the FPS device based on an operating state of the computing device. In some examples, the selective enablement instructions 106 may include instructions to disable or enable one or both of the fingerprint sensor and the power button of the FPS device based on a combination of an operating state of the computing device and the fingerprint data.

Figure 2:
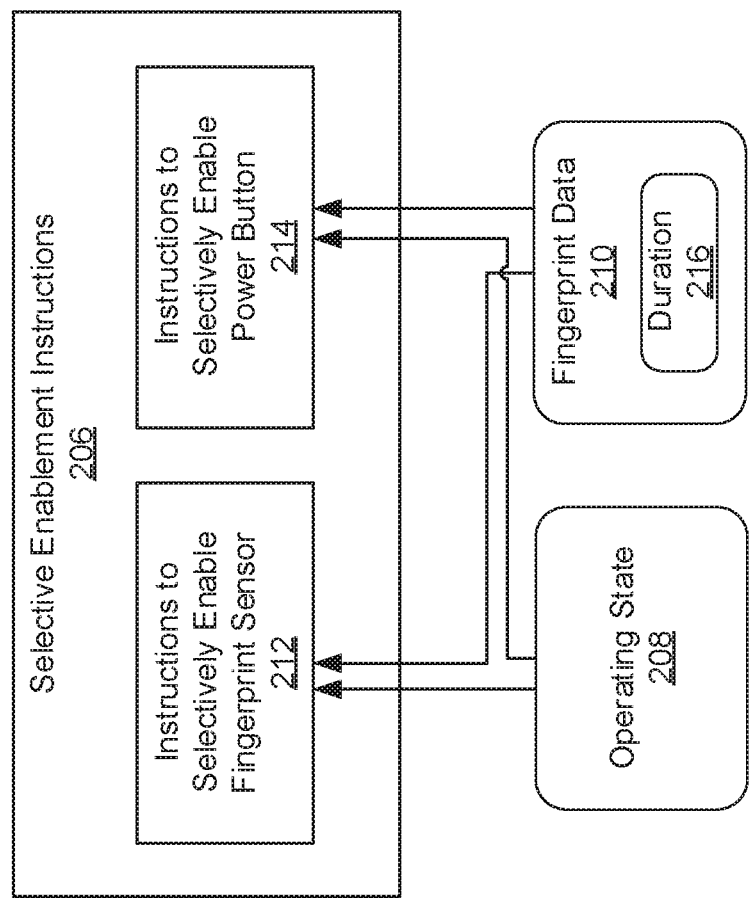
FIG. 2 is a schematic diagram showing example instructions to selective enable a fingerprint sensor and a power button of an FPS device.

FIG. 2 is a schematic diagram showing example selective enablement instructions 206. The selective enablement instructions 206 may be similar to the selective enablement instructions 106, and thus may be stored on a non-transitory machine-readable storage medium, along with identification instructions to identify an operating state 208 of a computing device, and obtention instructions to obtain fingerprint data 210 from an FPS device of the computing device. For further description of the above elements, the description of the medium 100 of FIG. 1 may be referenced.

The selective enablement instructions 206 may include instructions 212 to selectively enable the fingerprint sensor of the FPS device. In some examples, the instructions 212 may include disabling a feature of the fingerprint sensor based on the operating state 208 of the computing device. For example, where the computing device includes a closable lid, such as in the case of a notebook or laptop, instructions 212 may disable a wake-on-fingerprint feature of the FPS device when the lid of the computing device is closed.

The selective enablement instructions 206 may include instructions 214 to selectively enable a power button of the FPS device. In some examples, the instructions 214 may include disabling the power button based on the operating state 208 of the computing device. For example, instructions 214 may block the power button from lower the power state of the computing device when a software application has requested fingerprint authentication and the operating state 208 includes an indication that the fingerprint sensor of the FPS device is in a ready-to-capture state.

In some examples, the fingerprint data 210 may include a duration 216 of the finger touch at the FPS device. Further, the instructions 212 may dictate that a feature of the fingerprint sensor is to be disabled when the duration 216 of the finger touch is within a range corresponding to altering the operating state of the computing device and the computing device is in a low-power state, or in other words, when the finger touch at the FPS device was intended to alter the operating state 208 of the computing device. For example, instructions 212 may block a fingerprint scanning feature of a fingerprint scanner of an FPS device from scanning a fingerprint of a finger touch when the computing device is in a low-power state unless a single-sign-on feature is enabled and a duration of the finger touch of the FPS device is greater than a threshold duration.

Further, the instructions 214 may dictate that the power button is to be disabled when the duration 216 of the finger touch is within a range corresponding to a fingerprint scan and the computing device is in a full-power state, or in other words, when the finger touch at the FPS device was intended for a scanning purpose. Example instructions for determining whether a finger touch at the FPS device was intended for a scanning purpose or to alter the operating state 208 of the computing device are described with reference to FIG. 4. For example, instructions 214 may block a power button of an FPS device from lowering a power state of the computing device while the FPS device is in a ready-to-capture mode unless the FPS device is pressed for a duration greater than a threshold duration.

Figure 3A:
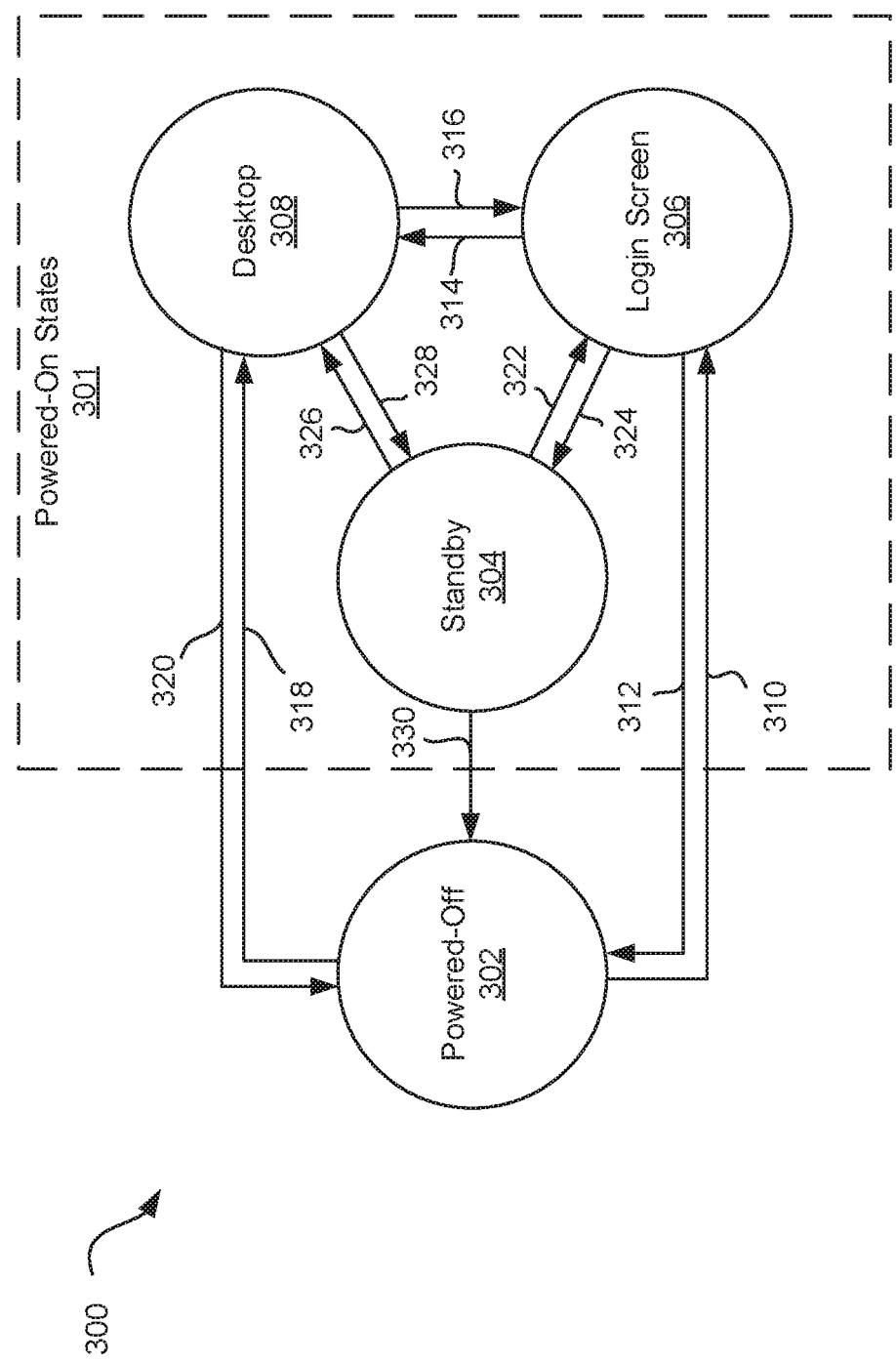
FIG. 3A is a state diagram showing an example behavioral system of a computing device showing operating states of the computing device and transition pathways between the operating states.

FIG. 3A is a state diagram showing an example behavioral system 300 of a computing device. The computing device may be similar to the computing device referred to in FIG. 1, and may store instructions similar to the instructions described therein.

The behavioral system 300 includes operating states of the computing device, including a powered-off state 302 (e.g., an S5 state according to the Advanced Configuration and Power Management Interface or ACPI specification), a standby state 304 (e.g., and S3 or M5 ACPI state), a login screen state 306 (e.g., an S0 ACPI state), and a desktop state 308 (e.g., an S0 ACPI state). The behavioral system 300 further includes transition pathways between the operating states which may be executed when corresponding transition conditions are met.

The computing device may transition from the powered-off state 302 to the login screen state 306 when a transition condition of a transition pathway 310 is met. The computing device may transition from the login screen state 306 to the powered-off state 302 when a transition condition of transition pathway 312 is met.

Further, the computing device may transition from the login screen state 306 to the desktop state when a transition condition of the transition pathway 314 is met. The computing device may transition from the desktop state 308 to the login screen state 306 when a transition condition of the transition pathway 316 is met.

Further, the computing device may transition from the desktop state 308 to the powered-off state 302 when a transition condition of the transition pathway 318 is met. The computing device may transition from the powered-off state 302 to the desktop state 308 when a transition condition of the transition pathway 320 is met.

Further, the computing device may transition from the standby state 304 to the login screen state 306 when a transition condition of the transition pathway 322 is met. The computing device may transition from the login screen state 306 to the standby state 304 when a transition condition of the transition pathway 324 is met.

Further, the computing device may transition from the standby state 304 to the desktop state 308 when a transition condition of the transition pathway 326 is met. The computing device may transition from the desktop state 308 to the standby state 304 when a transition condition of the transition pathway 328 is met.

Further, the computing device may transition from the standby state 304 to the powered-off state 302 when a transition condition of the transition pathway 330 is met.

The transition pathways 310, 312, 314, 316, 318, 320, 322, 324, 326, 328, and 330, are executed when a corresponding transition condition is satisfied.

A transition condition may be based on an operating state of the computing device, including a power state of the computing device. A power state of the computing device may include a powered-off state 302 or a powered-on state 301. A powered-on state 301 may include the standby state 304, the login screen state 306, and the desktop state 308. Further, a transition condition may be based on a further operating state of the computing device, such as the operating states discussed above. Further, a transition condition may be based on fingerprint data, or on a combination of fingerprint data and an operating state of the computing device.

Figure 3B:
FIG. 3B is a state transition table representation of the state diagram of FIG. 3A showing transition conditions for the computing device to transition between operating states.

FIG. 3B is a state transition table representing the example behavioral system 300 of FIG. 3A. The cells of the state transition table provide example transition conditions which satisfy transition pathways 310, 312, 314, 316, 318, 320, 322, 324, 326, 328, and 330, respectively. Thus, for example, the transition pathway 310 is to be executed to transition the computing device from a powered-off state 302 to a login screen state 306 when the duration of a touch of the FPS device is greater than, for example, four seconds, or another example threshold duration. As another example, the transition pathway 318 is to be executed to transition the computing device from the powered-off state 302 to the desktop state 308 when the power button of the FPS device is pressed and the single-sign-on feature is enabled. As another example, the transition pathway 322 is to be executed to transition the computing device from the standby state 304 to the login screen state 306 when the duration of a touch of the FPS device is between, for example, one and four seconds, or another example window of time. As another example, the transition pathway 326 is to be executed to transition the computing device from the standby state 304 to the desktop state 308 when a wake-on-fingerprint feature is enabled, and the fingerprint sensor of the FPS device has detected a matching fingerprint. Other example transition conditions are contemplated.

Transitions between operating states of the computing device may be limited by instructions which selectively enable the fingerprint sensor and selectively enable the power button according to an operating state of the computing device, or a combination of an operating state of the computing device and fingerprint data. Such instructions may disambiguate a finger touch of the FPS device and mitigate accidental or unintentional use of the FPS device.

FIG. 4 is a table showing an example table 400 including such instructions. The table 400 includes instructions to selectively enable the fingerprint sensor of an FPS device and to selectively enable the power button of an FPS device based on an operating state of a computing device. An instruction may be represented as a row in the table, where a "1" in a cell under an operating state column indicates that the operating state of the computing device includes the corresponding operating state of the column, and a "0" indicates that the operating state of the computing device does not include the corresponding operating state of the column. Further, a "1" in a cell under a fingerprint sensor device column indicates that the corresponding feature of the FPS device is enabled, and a "0" indicates that the corresponding feature of the FPS device is disabled. Ellipses (" . . . ") indicate that an instruction is agnostic as to the operating state or the enabled/disabled state of the feature of the FPS device.

For example, instruction 402 dictates that that the power button is to be disabled when the computing device is in a full-power (e.g. "desktop") state and the fingerprint sensor is in a ready-to-capture state.

As another example, instruction 404 dictates that a wake-on-fingerprint feature of the fingerprint sensor is to be disabled when a lid of the computing device is closed.

As another example, instruction 406 dictates that a scanning feature of the fingerprint sensor is to be disabled when the computing device is in a low-power (e.g. standby) state.

As another example, instruction 408 dictates that a scanning feature of the fingerprint sensor is to be disabled when a single-sign-on setting is enabled and the computing device is in a low-power (e.g. standby) state.

In other examples, an instruction may dictate that based on another combination of operating states, one or both of the power button and a feature of the fingerprint sensor are to be enabled or disabled. Other operating states on which an instruction may be based include a login state login state of a user account associated with the computing device.

Figure 5:
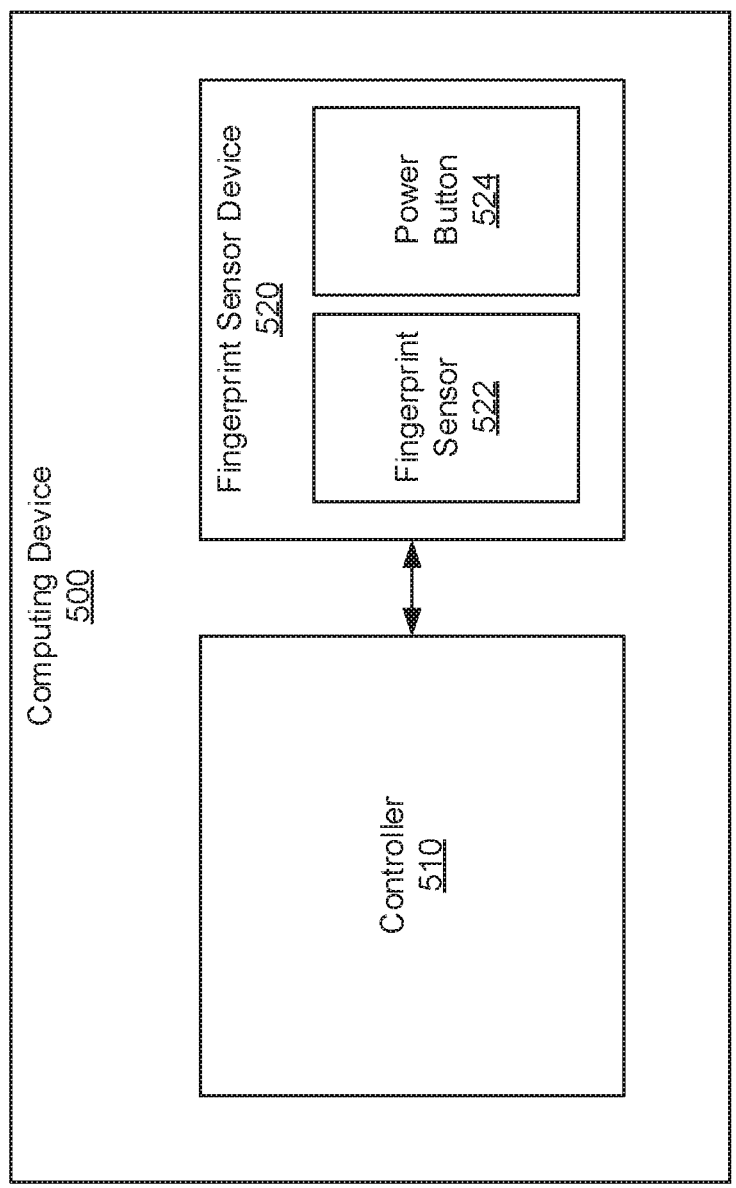
FIG. 5 is a schematic diagram of an example computing device including a controller to selectively enable a fingerprint sensor and a power button of an FPS device.

FIG. 5 is a schematic diagram of an example computing device 500 including a controller to selectively enable a fingerprint sensor and a power button of an FPS device. The computing device 500 includes an FPS device 520. The FPS device 520 includes a fingerprint sensor 522 to read a fingerprint and a power button 524 to alter an operating state of the computing device 500.

The computing device 500 further includes a controller 510 to identify an operating state of the computing device 500, where the operating state includes a powered-on state of the computing device 500. The controller 510 is further to obtain fingerprint data from the FPS device 520 based on a finger touch at the FPS device 520. The controller 510 is further to selectively enable the fingerprint sensor 522 based on the operating state and selectively enable the power button 524 based on the operating state to disambiguate the finger touch at the FPS device 520. Selectively enabling the fingerprint sensor 522 and selectively enabling the power button 524 may be based on instructions such as those described in the table 400 of FIG. 4.

Figure 6:
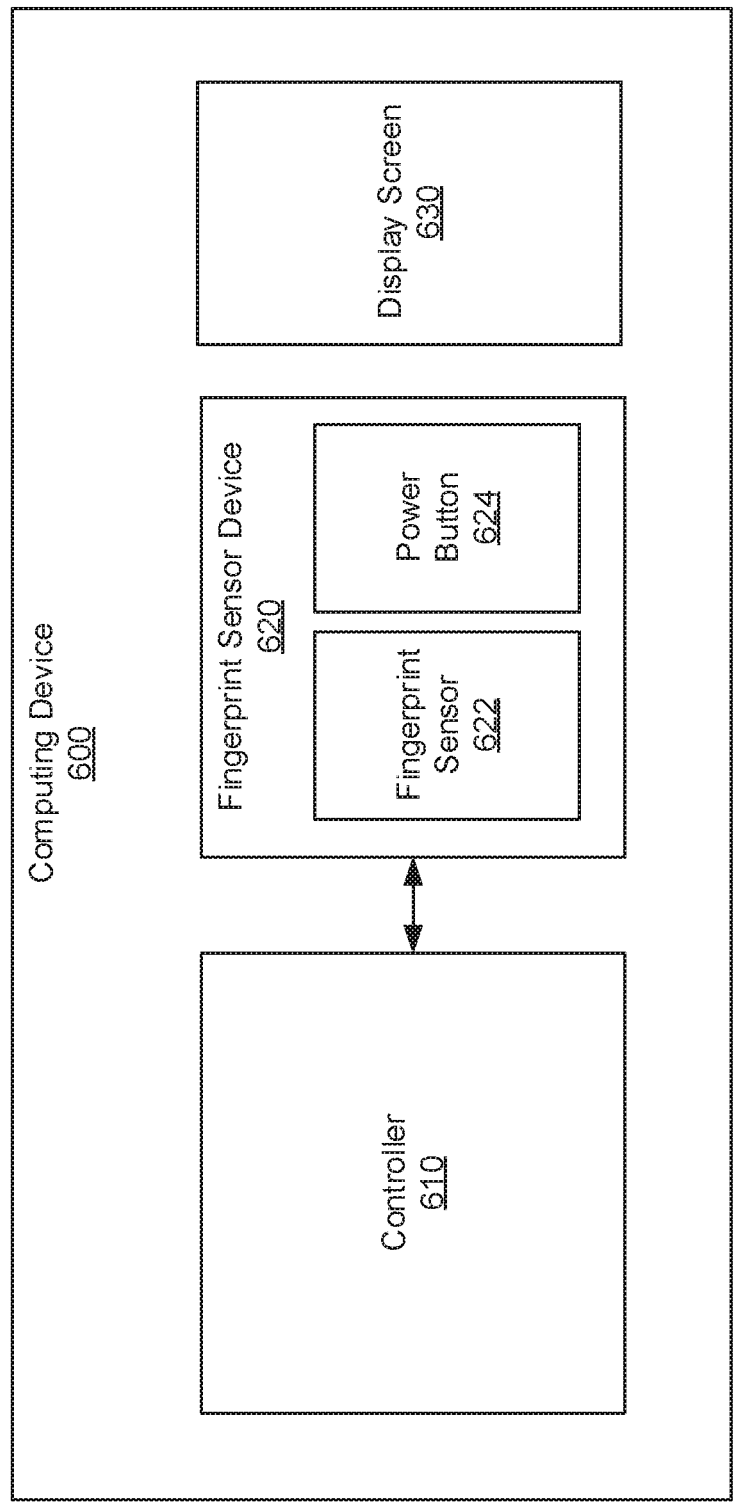
FIG. 6 is a schematic diagram of another example computing device 600 including a controller to selectively enable a fingerprint sensor and a power button of an FPS device.

FIG. 6 is a schematic diagram of another example computing device 600 including a controller to selectively enable a fingerprint sensor and a power button of an FPS device. The computing device 600 is similar to the computing device 500 of FIG. 5, and includes a controller 610 and an FPS device 620 including a fingerprint sensor 622 and power button 624. For further description of the above elements, the description of the computing device 500 of FIG. 5 may be referenced.

The computing device 600 further includes a display screen 630. Further, the operating state of the computing device 600 may include a power setting of the display screen 630. Thus, for example, instructions to selectively enable the fingerprint sensor 622 and selectively enable the power button 624 may be based on whether the display screen 630 is lit, dimmed, or off.

Figure 7:
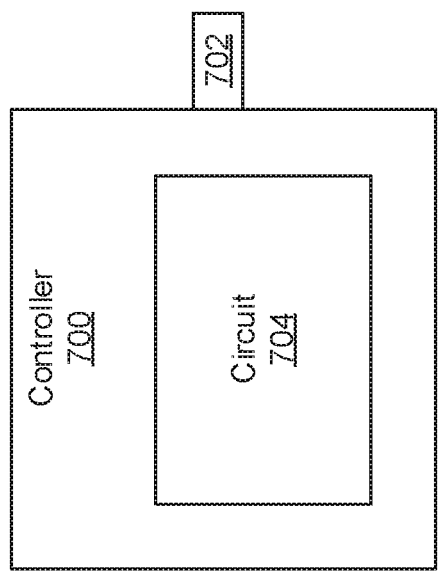
FIG. 7 is a schematic diagram of an example controller to selectively enable a fingerprint sensor and a power button of an FPS device.

FIG. 7 is a schematic diagram of an example controller 700 to selectively enable a fingerprint sensor and a power button of an FPS device. The controller 700 includes a pin 702 to communicate with an FPS device of a computing device, where the FPS device includes a fingerprint sensor to read a fingerprint and a power button to alter an operating state of the computing device. The operating state includes a powered-on state of the computing device. In some examples, the pin 702 may include a general-purpose input/output (GPIO) pin.

The controller 700 further includes a circuit 704 to identify the operating state of the computing device, obtain fingerprint data from the FPS device based on a finger touch at the FPS device, selectively enable the fingerprint sensor based on the operating state, and selectively enable the power button based on the operating state, to disambiguate the finger touch at the FPS device.

Figure 8:
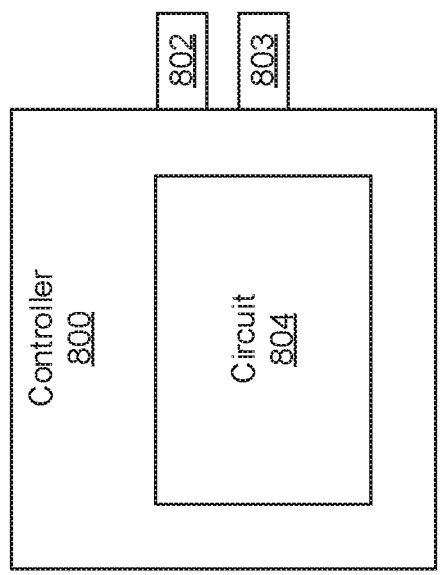
FIG. 8 is a schematic diagram of another example controller to selectively enable a fingerprint sensor and a power button of an FPS device.

FIG. 8 is a schematic diagram of another example controller 800 to disambiguate a finger touch of an FPS device. The controller 800 is similar to the controller 700 of FIG. 7, and includes a pin denoted as a first pin 802, and a circuit 804. For further description of the above elements, the description of the controller 700 of FIG. 7 may be referenced. Further, the controller 800 includes a second pin 803 to communicate with an FPS device of a computing device. Thus, certain communication tasks may be delegated between the first pin 802 and the second pin 803. For example, the first pin 802 may receive fingerprint data from the FPS device, and the second pin 803 may selectively enable the fingerprint sensor and the power button of the FPS device. Thus, the first pin 802 may receive fingerprint data from the fingerprint sensor device, and the circuit 804 may use the fingerprint data to determine when to selectively enable the fingerprint sensor of the fingerprint sensor device or the power button of the fingerprint sensor device.

Thus, accidental or unintentional use of an FPS device may be mitigated by the instructions, computing device, and controller described herein. Basing instructions for selectively enabling a fingerprint sensor and a power button of an FPS device on an operating state of a computing device allows for the development of a diverse set of instructions to be implemented to suit different use cases. Further, basing the instructions on fingerprint data received from the FPS device provides rang and flexibility to the set of instructions. Thus, the intention of a finger touch at an FPS device may be disambiguated.

Moreover, disambiguating a finger touch at an FPS device may prevent accidental shut down of a computing device, which mitigates against lost data and lost productivity which may be caused by a user accidentally shutting down the computing device. Further, disambiguating a finger touch at an FPS device may prevent a user from accidentally powering on a computing device, thereby conserving energy.

The scope of the claims should not be limited by the above examples, but should be given the broadest interpretation consistent with the description as a whole.

The invention claimed is:

1. A non-transitory machine-readable storage medium comprising instructions that when executed cause a processor of a computing device to:
   identify an operating state of the computing device when the computing device is powered on, the operating state including a powered-on state of the computing device;
   obtain fingerprint data from a fingerprint sensor device, the fingerprint sensor device including a fingerprint sensor to read a fingerprint and a power button to alter the operating state of the computing device; and
   selectively enable the fingerprint sensor based on the operating state and selectively enable the power button based on the operating state to disambiguate a finger touch at the fingerprint sensor device, wherein to selectively enable the fingerprint sensor includes disabling a feature of the fingerprint sensor, wherein the feature to be disabled is selected from a set of different features of the fingerprint sensor based on the operating state of the computing device.

2. The non-transitory machine-readable storage medium of claim 1, wherein selectively enabling the power button includes disabling the power button based on the operating state of the computing device.

3. The non-transitory machine-readable storage medium of claim 2, wherein:
   the fingerprint data includes a duration of the finger touch at the fingerprint sensor device; and
   the processor is to disable the power button when the duration of the finger touch is within a range corresponding to a fingerprint scan and the computing device is in a full-power state.

4. The non-transitory machine-readable storage medium of claim 2, wherein the processor is to disable the power button when the computing device is in a full-power state and the fingerprint sensor is in a ready-to-capture state.

5. The non-transitory machine-readable storage medium of claim 1, wherein:
   the fingerprint data includes a duration of the finger touch at the fingerprint sensor device; and
   the processor is to disable the fingerprint sensor when the duration of the finger touch is within a range corresponding to altering the operating state of the computing device and the computing device is in a low-power state.

6. The non-transitory machine-readable storage medium of claim 1, wherein the processor is to disable a wake-on-fingerprint feature of the fingerprint sensor when a lid of the computing device is closed.

7. The non-transitory machine-readable storage medium of claim 1, wherein the processor is to disable a scanning feature of the fingerprint sensor when the computing device is in a low-power state.

8. The non-transitory machine-readable storage medium of claim 1, wherein the processor is to disable a scanning feature of the fingerprint sensor when a single-sign-on setting is enabled and the computing device is in a low-power state.

9. The non-transitory machine-readable storage medium of claim 1, wherein the set of different features of the fingerprint sensor include a scanning feature and a wake-on-fingerprint feature.

10. A computing device comprising:
    a fingerprint sensor device including a fingerprint sensor to read a fingerprint and a power button to alter an operating state of the computing device; and
    a controller to:

identify the operating state of the computing device, the operating state including a powered-on state of the computing device;

obtain fingerprint data from the fingerprint sensor device based on a finger touch at the fingerprint sensor device; and selectively enable the fingerprint sensor based on the operating state and selectively enable the power button based on the operating state to disambiguate the finger touch at the fingerprint sensor device, wherein to selectively enable the fingerprint sensor includes disabling a feature of the fingerprint sensor, wherein the feature to be disabled is selected from a set of different features of the fingerprint sensor based on the operating state of the computing device.

11. The computing device of claim 10, wherein the operating state includes a login state of a user account associated with the computing device.

12. The computing device of claim 10, wherein the computing device comprises a display screen, and wherein the operating state includes a power setting of the display screen.

13. The computing device of claim 10, wherein the set of different features of the fingerprint sensor include a scanning feature and a wake-on-fingerprint feature.

14. A controller comprising:

a pin to communicate with a fingerprint sensor device of a computing device, the fingerprint sensor device including a fingerprint sensor to read a fingerprint and a power button to alter an operating state of the computing device, the operating state including a powered-on state of the computing device; and a circuit to identify the operating state of the computing device, obtain fingerprint data from the fingerprint sensor device based on a finger touch at the fingerprint sensor device, selectively enable the fingerprint sensor based on the operating state, and selectively enable the power button based on the operating state, to disambiguate the finger touch at the fingerprint sensor device, wherein to selectively enable the fingerprint sensor includes disabling a feature of the fingerprint sensor, wherein the feature to be disabled is selected from a set of different features of the fingerprint sensor based on the operating state of the computing device.

15. The controller of claim 14, wherein the pin includes a general-purpose input/output (GPIO) pin to selectively enable the fingerprint sensor of the fingerprint sensor device or the power button of the fingerprint sensor device.

16. The controller of claim 15, wherein the controller comprises another pin to receive the fingerprint data from the fingerprint sensor device, and wherein the circuit uses the fingerprint data to determine when to selectively enable the fingerprint sensor of the fingerprint sensor device or the power button of the fingerprint sensor device.

17. The controller of claim 14, wherein the set of different features of the fingerprint sensor include a scanning feature and a wake-on-fingerprint feature.

* * * * *